United States Patent [19]
Backlund et al.

[11] 3,756,529
[45] Sept. 4, 1973

[54] FUSELAGE SEAL

[75] Inventors: John G. Backlund, Los Angeles; Raymond P. Gibbs, Jr., Garden Grove, both of Calif.

[73] Assignee: McDonnell Douglas Corporation, Santa Monica, Calif.

[22] Filed: May 1, 1972

[21] Appl. No.: 249,017

[52] U.S. Cl. ............... 244/87, 244/48, 244/177 R
[51] Int. Cl. ........................................... B64c 9/02
[58] Field of Search ................... 244/155, 38, 46, 244/48, 49, 87, 117 R, 129, 130, 134; 416/245

[56] References Cited
UNITED STATES PATENTS

| | | | |
|---|---|---|---|
| 2,461,669 | 2/1949 | Wiley | 244/48 |
| 2,793,702 | 5/1957 | Cushman | 416/245 |
| 2,981,504 | 4/1961 | Parker | 244/117 R |
| 3,175,791 | 3/1965 | Toms | 244/130 |

*Primary Examiner*—Duane A. Reger
*Assistant Examiner*—Jesus D. Sotelo
*Attorney*—Walter J. Jason, Robert O. Richardson et al.

[57] ABSTRACT

A seal for the fuselage cutout portion for a movable horizontal stabilizer on an aircraft includes a fixed fairing member attached to the outer fuselage around the cutout portion with a pair of pivotally mounted doors hinged to the upper and lower surfaces of the fixed fairing on respective edges of the cutout portion to reduce the size of the openings on both sides of the stabilizer. Cam members are fixed to the upper and lower stabilizer surfaces for pivoting the doors inwardly upon pivotal movement of the stabilizer. Upper and lower smaller movable fairing members are attached to the stabilizer and lie adjacent the outer surface of the doors and may slide over the doors and fixed fairing for completely sealing the cutout opening during varying attitudes of the stabilizer.

5 Claims, 6 Drawing Figures

PATENTED SEP 4 1973 3,756,529

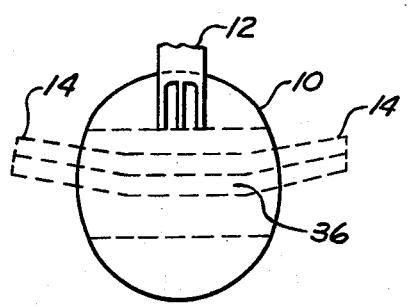
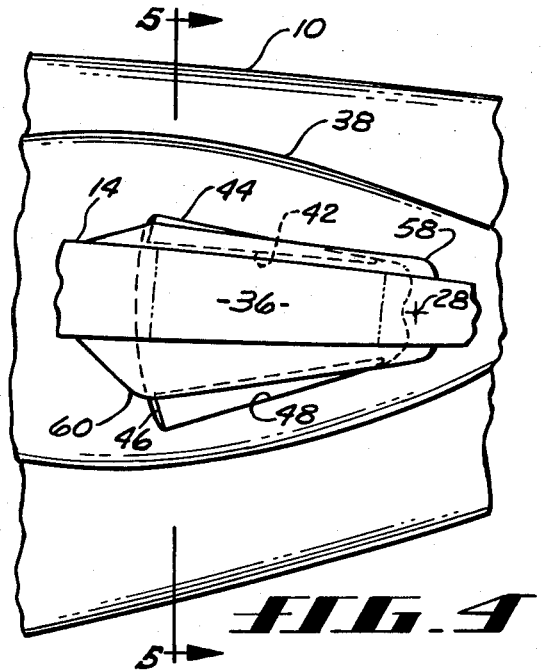
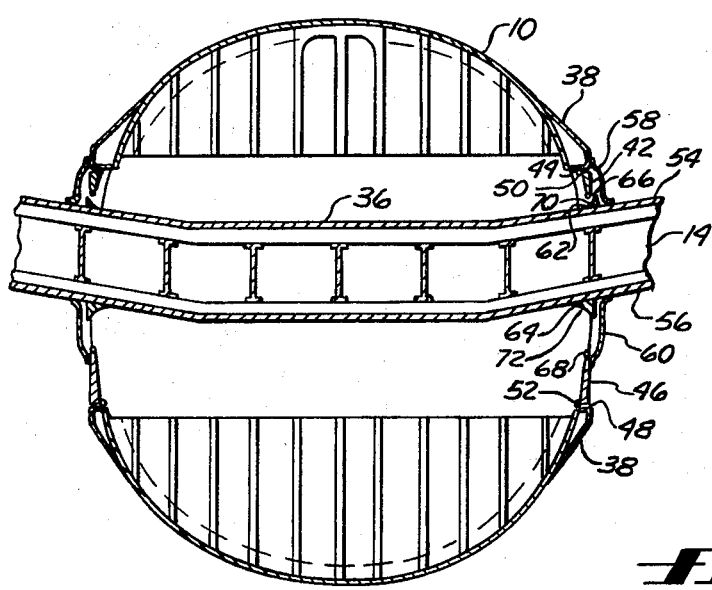
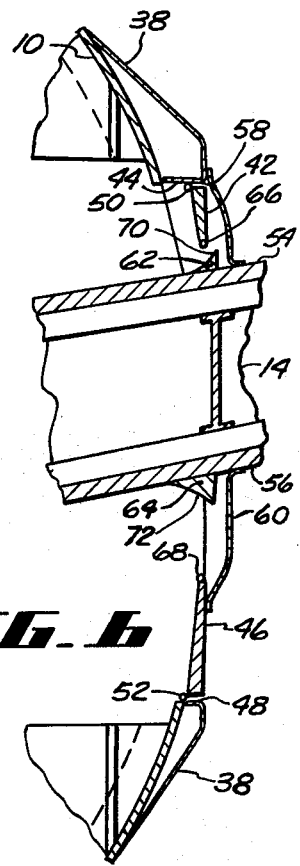

3,756,529

FUSELAGE SEAL

BACKGROUND OF THE INVENTION

Most aircraft have a vertical tail surface extending upwardly from the rear end of the aircraft fuselage and a horizontal stabilizer extending laterally from the fuselage. The vertical tail surface usually has a movable fin along its trailing edge for directional control and the horizontal stabilizer has elevators along the trailing edge for pitch control. The fixed portions of these tail surfaces attach to the fuselage and the movable fin and elevators are hingedly mounted to the fixed portions. Thus there is no movable portion extending from the fuselage so the need for the present invention is not presented.

There are some relatively small aircraft in which the horizontal stabilizer also pivots. In this case the stabilizer is mounted on a rotatable bar that passes through the fuselage. Since the bar is round and rotates, there is no exposed cutout portion of the fuselage to disrupt the airflow in that area. This type of aircraft also has no need for the present invention.

Aircraft continue to be built larger to accommodate larger and more profitable payloads. They also have a higher speed and thus require larger movable surfaces for controlling the aircraft in its various modes of flight. One of these movable surfaces is the horizontal stabilizer which protrudes into the fuselage. Instead of a round bar, as in the case of smaller aircraft, the structure of the horizontal stabilizer passing through the fuselage has a rectangular cross section and pivots on an axis that is rearwardly disposed from it. Hence, a fuselage cutout portion is necessary to permit the arcuate movement of the rectangular section as it pivots about its remote axis. Airflow around this fuselage and horizontal stabilizer juncture can be badly disturbed when these cutout portions are exposed.

One solution to the problem may be found in U.S. Pat. No. 2,981,504 which issued to A. E. Parker Apr. 25, 1961. It consists of a resilient seal fixed to the stabilizer with rollers on the free edge for rolling up and down the fuselage wall above, and below, the opening. The fuselage itself had a conical indentation to reduce the flexing of the seal.

SUMMARY OF THE PRESENT INVENTION

In accordance with the present invention wherein a horizontal stabilizer is pivotally mounted to the fuselage, a fixed fairing member is attached to the outer fuselage around the stabilizer opening to place the opening in a substantially vertical plane angularly oriented to the pivot axis of the stabilizer. This fixed fairing on the fuselage has a pair of pivotally mounted doors hinged to the upper and lower surfaces of the fixed fairing opening to reduce substantially the size of the openings on both sides of the stabilizer. Cam members are fixed to the upper and lower stabilizer surfaces for pivoting the doors inwardly upon a relatively large pivotal movement of the stabilizer to permit the stabilizer to move within the full opening. The closure structure also includes upper and lower substantially smaller movable fairing members attached to the stabilizer which lie adjacent the outer surface of the doors and which may slide over the doors and the fixed fuselage fairing for completely sealing the opening during varying attitudes of the stabilizer.

BRIEF DESCRIPTION OF THE DRAWINGS

FIG. 3 is a schematic illustration showing the horizontal stabilizer angularly extended from the fuselage;

FIG. 4 is a side elevational view showing the seal;

FIG. 5 is a vertical sectional view taken along the line 5—5 of FIG. 4, and

FIG. 6 is an enlarged view of a portion of FIG. 5.

Figure 1:
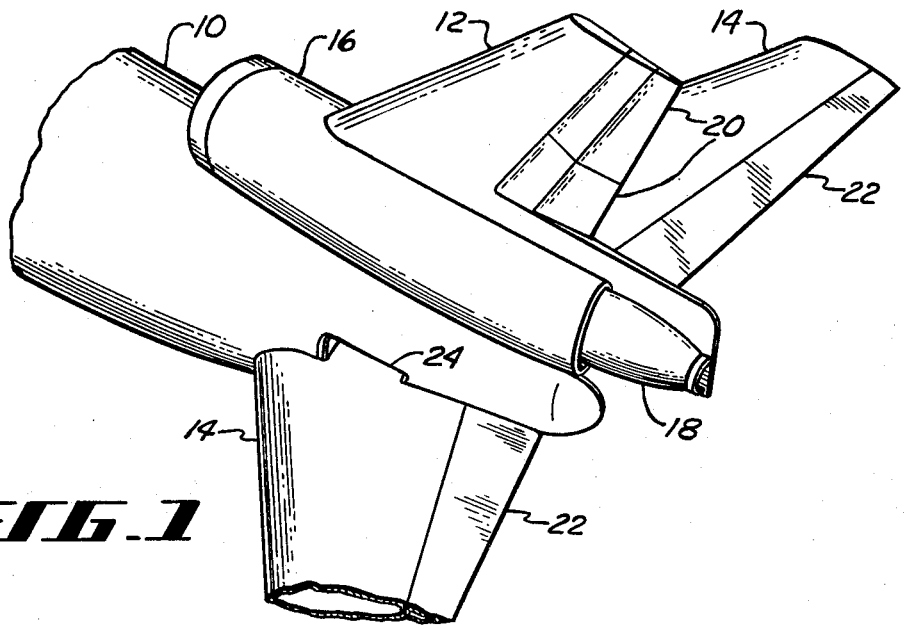
FIG. 1 is a perspective view of the tail section of an aircraft before the fairing and seal was added.

Reference is now made to FIG. 1 where there is shown rear section 10 of an aircraft fuselage having a vertical tail section 12 and a horizontal stabilizer 14. Within the vertical tail section is an air inlet 16 to the rear of which is a tail mounted engine 18. The vertical tail section has movable fins 20 along the trailing edge for directional control purposes and the horizontal stabilizer has movable elevators 22 along its trailing edges. However, in this embodiment, the horizontal stabilizers also pivot up and down in order to achieve a desired slope angle relative to the flight path of the aircraft. The horizontal stabilizer is therefore pivotally mounted on the fuselage 10 and passes through an opening 24 which is enlarged for this purpose.

Figure 2:
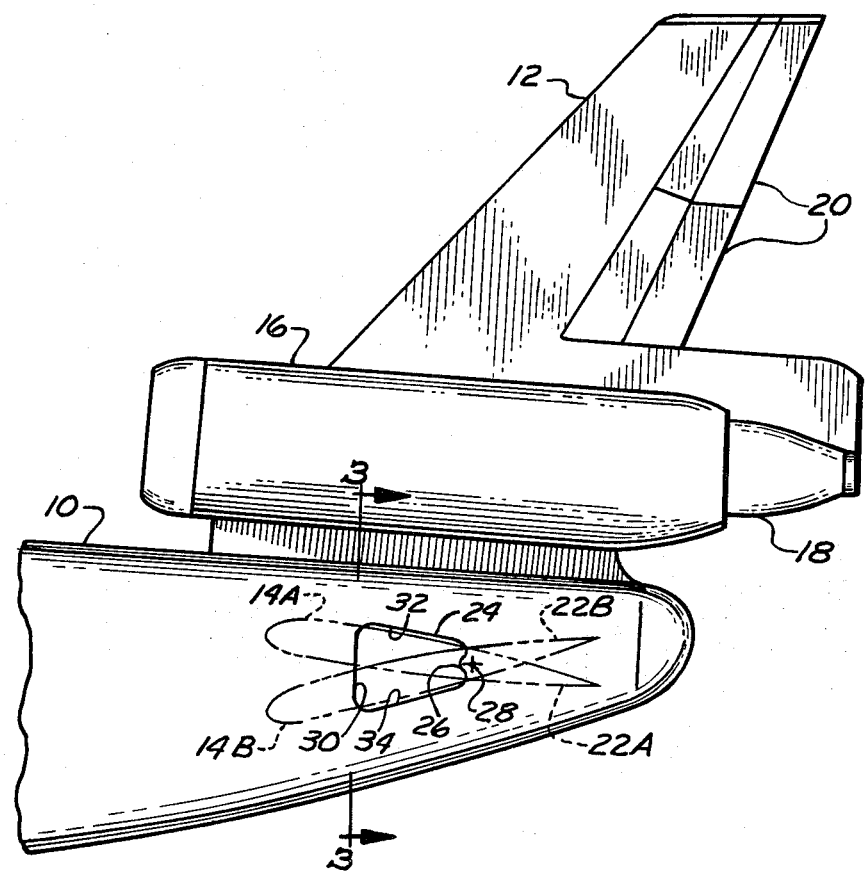
FIG. 2 is a side elevational view with extreme pitch positions of the stabilizer shown in phantom lines.

As shown in FIG. 2, the fuselage opening 24 is somewhat trapezoidal in shape, having a shorter vertical edge 26 close to the stabilizer pivot point 28 and a larger forward edge 30 spaced farther away from the pivot point 28. These edges are connected through a top edge 32 and a lower edge 34. The upper edge 32 of opening 24 must be sufficient to permit the horizontal stabilizer to pivot about pivot point 28 so that the stabilizer is in the raised position indicated at 14A and the lower edge 34 must be such that the horizontal stabilizer may be pivoted downward to its postion 14B. The trailing edge elevators 22 may vary in position from that shown in 22A and 22B without consideration since they are pivotally mounted on the stabilizer 14 and do not extend into the fuselage 10.

FIG. 3 is a schematic illustration taken along the line 3-3 in FIG. 2. The purpose of this schematic is to show that a spar 36 connects the horizontal stabilizers 14 which have a dihedral angle to the horizontal plane as they extend outwardly from the fuselage 10. This angulation together with a curvature of the fuselage, further compounded with the rearwardly spaced pivot point 28 make the closure of the enlarged opening in the fuselage a special problem.

The solution to the problem presented in the first three Figures are set forth in the remaining drawings. Here there is shown a fixed fairing 38 affixed to the fuselage 10. This fairing changes the contour of the fuselage in that area to accommodate a cutout portion, the plane of which is vertical, normal to the pivotal axis 28 of the stabilizer 14 and paralled to the axis of the aircraft. This cutout portion permits movement of the stabilizer 14 between its maximum up and down position without interference from fairing 38.

A triangular-shaped upper door 42 is pivotally mounted to, and extends down from, the upper edge 44. Similarly, a triangular-shaped lower door 46 is pivoted to, and extends upwardly from, the lower edge 48. Their hinges 50, 52 are spring-loaded to urge these doors in their position shown in FIGS. 5 and 6. Attached to the upper and lower surfaces 54, 56, respectively, of stabilizer 14 are movable fairings 58, 60, respectively, which slide over the outer surface of fixed fairing 38 and the upper and lower doors 42, 46, respectively. Cams 62, 64 are mounted on the upper and lower surfaces 54, 56 to deflect doors 42, 46 inwardly during large positive and negative pitch movements of the stabilizer 14. Rollers 66, 68 on the free edges of doors 42, 46 make contact with the inwardly sloping edges 70, 72 of cams 62, 64 for this purpose. The rollers then roll along the stabilizer surfaces for further door deflection as the stabilizer continues to pivot. The doors are spring-loaded in a manner that will return them to their faired positions when the stabilizer returns to a more neutral position such as that shown in FIG. 4.

While it is important that the cutout portion be covered by fairings or doors during the cruise attitude of the stabilizer, it is less important in the extreme positions of takeoff, climb or landing, all of which occur at lesser airspeeds. Thus, while one of the doors is pivoted inwardly on one stabilizer surface to permit stabilizer movement in that direction, the extreme pivotal movement of the stabilizer may cause a gap or air space between the other door and movable fairing on the other stabilizer surface. However, this is permissible since it occurs only when the aircraft is in a non-cruise attitude.

The foregoing embodiment was described as having upper and lower doors. However, in some aircraft configurations wherein the attitude of the stabilizer is such, the upper edge 44 of fairing 38 may be lowered and the height of the movable fairing 58 increased, and the upper door 42 may be eliminated.

Havng thus described an illustrative embodiment of the present invention, it is to be understood that modifications thereof will become apparent to those skilled in the art and it is to be understood that these deviations are to be construed as part of the present invention.

We claim:

1. A fuselage seal for a substantially horizontal control surface of an aircraft pivotally mounted to the fuselage thereof, comprising:
   a fixed fairing on said fuselage around the area of movement of said control surface, said fairing having a cutout portion where said control surface passes through said fuselage,
   a movable fairing attached to said control surface,
   a door pivotally mounted on an edge of said cutout portion, said door having an outer surface forming a continuation of said fixed fairing when said door is in a position undisturbed by said control surface,
   said movable fairing and said door covering said cutout portion during limited pivotal movement of said control surface,
   said door being adapted to pivot inwardly upon contact with said control surface to permit greater pivotal movement of said control surface.

2. A fuselage seal as in claim 1 and means urging the return of said door to its undisturbed position when said control surface is no longer in contact therewith.

3. A fuselage seal as in claim 1 wherein cam surfaces are provided on said control surface for deflecting inwardly the edge of said door when in contact therewith.

4. A fuselage seal as in claim 1 wherein said cutout portion is a vertically oriented wedge-shaped portion positioned forwardly of the pivotal axis of said control surface,
   said wedge-shaped portion having an upper and a lower edge extending fore and aft along said fairing, and
   said door being pivotally mounted along said upper edge and another door being pivotally mounted along said lower edge.

5. A fuselage seal as in claim 4 wherein said control surface has an upper movable fairing and a lower movable fairing to complete the covering of siad cutout portion during limited pivotal movement of said control surface.

* * * * *